United States Patent [19]

Stauffer

[11] Patent Number: 4,827,120

[45] Date of Patent: May 2, 1989

[54] RADIATION SENSOR WHEREBY RADIATION IS DIFFUSED THROUGH THE MATERIAL

[75] Inventor: Norman L. Stauffer, Englewood, Colo.

[73] Assignee: Honeywell Inc., Minneapolis, Minn.

[21] Appl. No.: 113,385

[22] Filed: Oct. 22, 1987

Related U.S. Application Data

[63] Continuation of Ser. No. 826,057, Feb. 4, 1987, abandoned.

[51] Int. Cl.⁴ .......................... H01J 40/14; G01J 1/42
[52] U.S. Cl. .................................... 250/227; 250/209; 356/225
[58] Field of Search ................... 250/209, 210, 211 K, 250/227, 578; 356/225-236, 400

[56] References Cited

U.S. PATENT DOCUMENTS

| | | | |
|---|---|---|---|
| 3,840,741 | 10/1974 | Melchior | 250/227 |
| 3,953,131 | 4/1976 | Britz | 250/227 |
| 4,150,285 | 4/1979 | Brienza et al. | 250/227 |
| 4,181,398 | 1/1980 | Sick | 356/225 |
| 4,703,173 | 10/1987 | Wood et al. | 250/227 |

Primary Examiner—David C. Nelms
Assistant Examiner—Stephone B. Allen
Attorney, Agent, or Firm—Charles J. Ungemach

[57] ABSTRACT

A radiation spot position sensor utilizing a diffuse material upon which a spot of radiation impinges and diffuses from that point outwardly along the material to the two ends thereof in a proportion indicative of the linear position of the spot along the sensor so as to be detected by radiation sensing devices located at the ends to produce and output that can be used to determine the linear position of the spot.

19 Claims, 1 Drawing Sheet

RADIATION SENSOR WHEREBY RADIATION IS DIFFUSED THROUGH THE MATERIAL

This application is a continuation of application Ser. No. 826,057, filed Feb. 4, 1987 now abandoned.

BACKGROUND OF THE INVENTION

In the art of radiation sensing, it is often desirable to be able to determine the position of a beam of radiation or the position of a spot of light on a detector. For example, in my co-pending application Ser. No. 675,665, file Nov. 28, 1984, and assigned to the assignee of the present invention, I describe a system for determining the position of a surface for use in such applications as determining the placement of machine parts, materials, sheets, or objects without using tape measures or other normal contact devices. In this system a beam of light is transmitted to the surface whose position is to be sensed and the return beam of light falls on a detector as a spot of light. The position of this spot of light on the detector provides an indication of the position of the surface being sensed. Spot or beam position sensors used in the prior art and in my above referred to co-pending application comprise a position sensing photo-detector such as is manufactured and sold by United Detector Technology Company under the designation LSC-30D, for example. Such a detector consists of an elongated central photo-detector portion with two end portions to which electrical contact is made. When the spot of light is directly at the center of the detector, the current in the photo-detector divides evenly and the electron migration to the two ends is substantially equal, but when the spot is nearer to one end than the other, more current will flow to the closer end than to the further end and by analyzing the output from the ends of the detector an indication of the position of the spot may be obtained. These prior art detectors, sometimes referred to as "lateral effect photo-diodes" are quite temperature sensitive and their variance with temperature is rather unpredictable. Furthermore, the cost of lateral effect photo-diodes is also quite high and accordingly a need is created for a spot position sensor which is lower in cost, less sensitive to temperature and has a more predictable temperature variation from one sample to another.

SUMMARY OF THE INVENTION

The present invention utilizes an elongated piece of material shaped, for example, as a tube or cylinder, and which can operate to diffuse or scatter radiation such as light therein. This tube is surrounded for the most part by a layer of material having a reflective interior surface and a window is provided therethrough which will admit radiation coming to the tube. The beam of radiation enters the tube through the window at some position along its length. If the spot enters in the center of the tube, then light in the tube will be diffused outwardly towards the ends in equal amounts. Most of the light will not escape the tube because of the reflective layer of material therearound. If the light enters the tube nearer to one end than the other, more light will be scattered towards the near end than the more remote end. Radiation sensing devices such as standard low cost photo-diodes are mounted at the ends of the tube to produce signals indicative of the amount of light reaching each end. By comparing the signals indicative of the amount of light at the ends of the tube, an indication of the position of the spot of light can be obtained. Since the material scatters light to produce signal in standard photo-diodes rather than by causing electron migration as in a lateral effect photo-diode, the effects of temperature are less pronounced, the repeatability of the temperature effects is greater from one sample to another, and the cost is reduced. When the photo-diodes operate in a logarithmic mode with a high impedance circuit, a substantially linear output can be obtained. The logarithmic operation, however, because of its high input impedance, causes the photo-diodes to have a greater temperature sensitivity than may be desired in some cases. Accordingly, as an alternate embodiment, the output of the photo-diodes can be presented to a low impedance circuit in which event the output will be non-linear. This problem can be overcome, however, by use of a microprocessor to linearize the output of the detector circuit so as to produce a linear output signal for use by the downstream position sensing system.

DETAILED DESCRIPTION OF THE PREFERRED EMBODIMENTS

Figure 1:
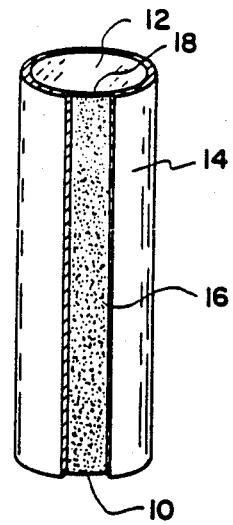
FIG. 1 shows a view of the sensor of the present invention.

In FIG. 1, a tube or cylinder of diffusing material 10 is shown having clear ends, the upper one of which bears reference numeral 12. A coating of material 14 which is reflective at least on the inner surface thereof is shown surrounding the tube 10 in such a way as to leave a window 16 along the length of the tube 10. As will be described hereinafter, light entering the system will appear as a spot entering through the window 16. The window 16 may be coated with a highly diffusing coating 18 which serves to scatter the light into the interior of the tube so as to make operation insensitive to the direction of the radiation beam to the tube. This light will enter the tube 10 and then be diffused towards the ends thereof. This light will not escape the system throughout the major portion of its surface because of the reflective quality of the layer 14. Photo-diodes will be mounted on the end such as 12 to receive the light that is diffused by the tube 10 and will produce electrical output signals in accordance with the light they receive. If the light spot is substantially in the center of the tube 10, then the amount of light reaching the photo-diodes will be substantially the same and the output signals from the photo-diodes will be substantially equal. If the spot of light is nearer to one end or the other, then the amount of light that reaches that end will be greater than the amount of light reaching the other end and accordingly the output of the photo-diode at that end will be greater than the output of the photo-diode at the other end. As will be described, by comparing these signals, for example, taking the difference between the outputs of the photo-detectors and dividing by the sum of the outputs of the photo-detectors, an indication of the position of the spot on the tube 10 may be obtained for whatever measurement or control purposes desired.

The tube 10 is a solid diffusing material such as an "opal" plastic or glass (preferably pot opal). The ability of the material to diffuse the light entering therein is of significant importance since if the diffusing is too great, the amount of light reaching the ends will not be large enough to create signals useful in the system electronics and if the diffusion is not great enough then, although the amount of light reaching the ends will be significantly large, the amount of variation which occurs when the spot of light moves along the length of the window 16 will not be sufficiently large enough to produce a signal useful in the system electronics. It has been found desirable to have the absorption coefficient of the material be in the range of about 0.1 to 0.4 per millimeter of tube length with a length of about 20 millimeters and a diameter of about 5 millimeters. I have also found that creating a diffuse tube 10 by inserting a plurality of small glass spheres of diameter between about 10 and 100 microns into a clear plastic casting resin to a concentration of about 10 grams per 100 milliliters of resin, then hardening the material with 17 drops of hardener, the absorption coefficient is about 0.15 for the desired tube length of approximately 20 millimeters with approximately a 5 millimeter diameter.

The reflective material 14 may be a coating which is painted or sputtered on the tube 10 but, in the preferred embodiment, a sheath of polished aluminum is slipped over the tube 10 to produce the desired reflective surface. The ends of the material 10 are polished so that light passes therethrough with minimum loss. The commercially available photo-diode detectors (not shown in FIG. 1) are mounted at the ends of tube 10 to receive the light and to produce electrical output signals for use in the circuitry to be described below.

Figure 2:
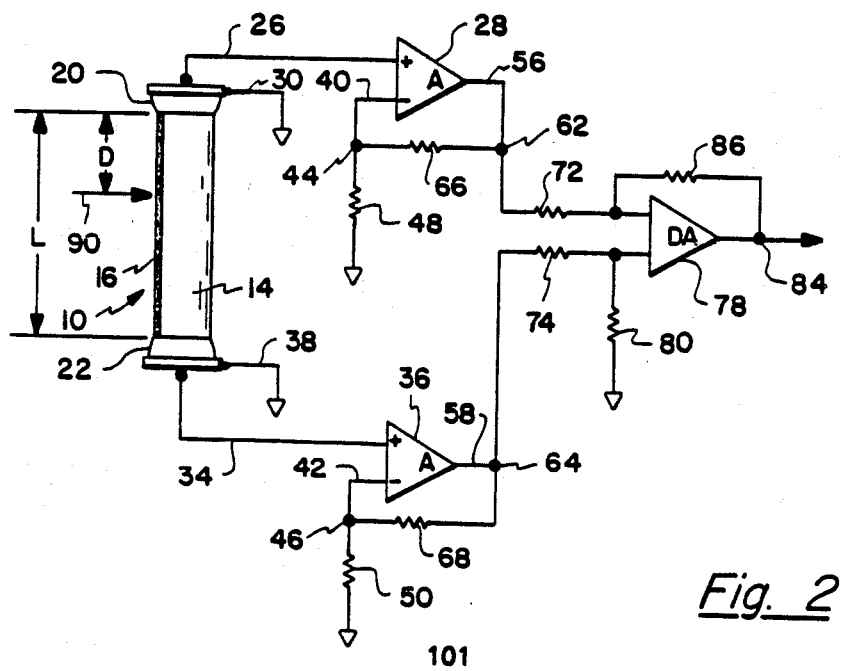
FIG. 2 shows a schematic representation of a logarithmic circuit for use with the sensor of the present invention.

In FIG. 2, the diffuse tube 10 with the reflective coating 14 and the light window 16 is shown having first and second photo-diodes 20 and 22 connected on the ends thereof. While photo-diodes are shown herein, it should be understood that other types of radiation sensors may also be employed. Photo-diode 20 has a first output conductor 26 connected to the positive input of an amplifier 28 and a second output conductor 30 connected to signal ground. Photo-diode 22 has a first output conductor 34 connected to the positive input of an amplifier 36 and a second output conductor 38 connected to signal ground. The negative input terminals of amplifiers 28 and 36 are connected by conductors 40 and 42 respectively to junction points 44 and 46 respectively and then through resistors 48 and 50 respectively to signal ground. In FIG. 2, the amplifiers 28 and 36 are arranged to provide a high impedance circuit. The outputs of amplifiers 28 and 36 are connected by conductors 56 and 58 respectively to junction points 62 and 64 respectively. Junction points 62 and 64 are connected through resistors 66 and 68 respectively to junction points 44 and 46 respectively. Junction points 62 and 64 are also connected through resistors 72 and 74 respectively to the inputs of a differential amplifier 78. The lower input of differential amplifier 78 is connected through a resistor 80 to signal ground. The output of differential amplifier 78 is connected by a conductor 84 to the downstream utilization apparatus such as the surface position sensor described in my co-pending application referred to above (not shown) and through a resistor 86 back to the upper input terminal of differential amplifier 78.

In FIG. 2 the length of the diffuse tube 1 is shown as L and the radiation which is presented to the sensor through window 16 is shown by an arrow 90 located at a distance D from the upper end of the diffuse sensor 10.

The high impedance to the amplifiers 28 and 36 causes the photo-diodes 20 and 22 to operate in the log response mode and the output from the amplifier is therefore substantially linear with changes in the distance D. More particularly, with the circuit of FIG. 2, the open circuit sensor voltage for each sensor is:

$$V_{oc} = \frac{kT}{e}\left(\ln\frac{I_{sc}}{I_0} + 1\right) \quad (1)$$

In equation (1), k is a constant of proportionality, T is the temperature in degrees absolute, e is in the Napierian logarithm base, $I_{sc}$ is the photo-diode short-circuit current, and $I_0$ is the photo-diode reverse saturation current. The photo-diode output is related to the distance D along the length of the diffusion sensor 10 for the upper photo-diode 20 as follows:

$$I_{sc} = F\,e^{-AD} \quad (2)$$

and for the lower photo-diode 22:

$$I'_{sc} = F\,e^{-A(L-D)} \quad (3)$$

In equations (2) and (3), A is the absorption co-efficient of the material of the probe 10, F is proportional to the flux or intensity of the light spot, and L is the tube length.

Substituting equations (2) and (3) into equation (1) and subtracting the output voltage of the lower sensor from that of the upper sensor the resulting output will be given by:

$$V_R = \frac{kTA}{e}(L - 2D) \quad (4)$$

It is seen that this output is linear with the position D and accordingly the output signal on line 84 in FIG. 2 can be used directly as an indication of the spot position without further characterization in the utilization apparatus.

One difficulty that is encountered with the circuit of FIG. 2 is that while the apparatus is less sensitive to temperature changes than was the case in the prior art lateral effect photo-diodes, there still is some temperature dependence which would require temperature compensation downstream of the system if any significant changes in temperature were going to be encountered in the use of the apparatus. It has also been found that with the apparatus of FIG. 2, the light represented by arrow 90 cannot be modulated as might be desirable in some cases and on occasion the center of a broad spot of light appearing in window 16 is not determined precisely by the circuitry. Accordingly, in systems where large temperature variations may be expected or where the exact center of a broad spot of light is desired or in which modulated light is to be employed, an alternate circuit can be utilized as shown in FIG. 3.

Figure 3:
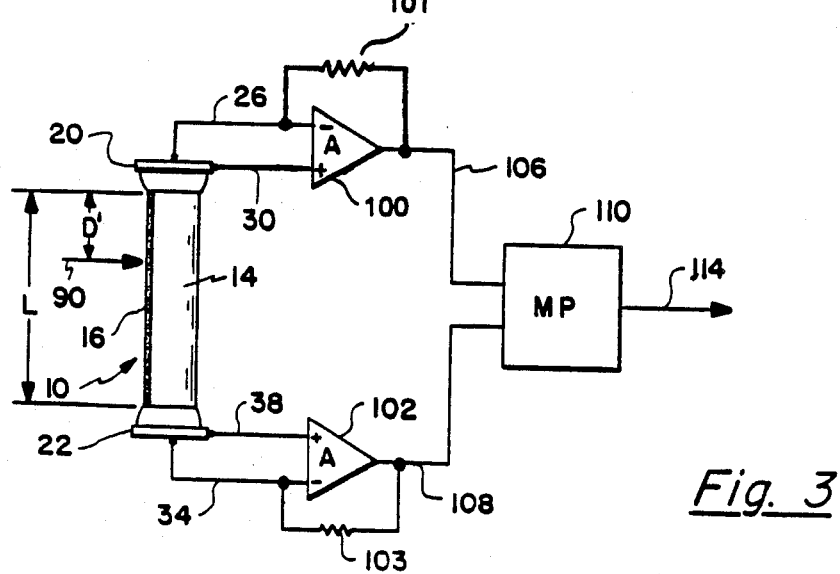
FIG. 3 shows a schematic representation of a linear circuit and microprocessor for use with the detector of the present invention.

In FIG. 3, the diffuse sensor 10 with the reflective coating 14 and the window 16 is shown having the photo-diodes 20 and 22 connected to the ends thereof as was the case in FIG. 2. The output leads of photo-diode 20 are connected by conductors 26 and 30 to the input of an amplifier 100 having a feedback resistor 101 and connected to provide a low impedance circuit rather than to a high impedance amplifier circuit as was the case in FIG. 2. Similarly, the output leads of photo-diode 22 are connected by conductors 34 and 38 to the two inputs of an amplifier 102 having a feedback resistor 103 and connected to provide a low impedance circuit rather than to the high impedance amplifier circuit as was the case in FIG. 2. Since amplifiers 100 and 102 operate as low input impedance amplifiers, the photo-diodes 20 and 22 will not be operating in their logarithm mode and accordingly the output from the amplifiers 100 and 102 will not vary in a linear fashion as was the case in FIG. 2. The non-linear outputs of amplifiers 100 and 102 are connected by conductors 106 and 108 respectively to the input of a microprocessor 110 having an output at 114. Microprocessor 110 will be operable to linearize the signals appearing on conductors 106 and 108 and combine them to produce a linear output on line 114 as described in more detail below.

As was the case in connection with FIG. 2, the length of the diffuse sensor 10 is shown as L and the distance that the light beam 90 passes through the window 16 is shown by the distance D. Under these circumstances, the output from the upper diode is as follows:

$$V_{20} = mF(1 - e^{-AC})(e^{-AD}) \qquad (5)$$

and from the upper diode:

$$V_{22} = mF(1 - e^{31\,AC})(e^{-A(L-D)}) \qquad (6)$$

where C is the diameter of the tube 10.

As it can be seen, the signals represented by equations (5) and (6) vary with the position D in a non-linear fashion. To overcome this, the microprocessor 110 may be programmed to compensate for the non-linearity. More particularly, a look-up table may be employed in which from experimental operation the distance to the center of the spot can be accurately obtained for different output voltages so that given certain voltages on lines 106 and 108, the microprocessor 110 will operate to determine the value of D indicative of the position along the tube 10 where the spot of light passes through window 16. This output will then be passed from output 114 to the downstream utilization apparatus (not shown) such as the surface position sensor in my above-described co-pending application.

As can be seen from equations (5) and (6), the circuit of FIG. 3 is not temperature sensitive and although the outputs from the amplifiers are not linear, the microprocessor will correct this situation. FIG. 3 also has the advantage of being able to use modulated light as an input and accordingly will find use under many circumstances.

It is also possible to utilize the electronics found in FIG. 4 of my co-pending application mentioned above. Other circuits and obvious modifications to the sensor disclosed herein will occur to those skilled in the art and accordingly I do not wish to be limited to the specific disclosure used in connection with the preferred embodiment described herein. I intend only to be limited by the following claims.

I claim:

1. A radiation sensor comprising:
   an elongated cylinder of radiation diffusing material and having first and second end portions;
   means directing radiation to the cylinder, the radiation entering into the material at a first position intermediate the first and second end portions, and within the material being diffused so as to travel through the material from the first position toward the first and second end portions in an amount which varies with the distance from the first position to the first and second end portions; and
   radiation responsive detector means mounted to receive radiation at the first and second end portions and producing first and second output signals in accordance therewith which vary with the distance from the first position to the first and second end portions.

2. Apparatus according to claim 1 further including an additional layer of diffusing material on the elongated cylinder at the first position to scatter radiation into the interior of the elongated member.

3. Apparatus according to claim 1 further including a reflective coating material surrounding the elongated cylinder and having a window therethrough at the first position to admit the radiation to the diffusing material.

4. Apparatus according to claim 1 wherein the diffusing material has an absorption co-efficient substantially between 0.1 and 0.4 per millimeter.

5. Apparatus according to claim 1 further including means connected to receive and compare the first and second output signals to provide a resultant output indicative of the location of the first position between the first and second end portions.

6. Apparatus according to claim 3 further including an additional layer of diffusing material on the elongated cylinder at the first position to scatter radiation into the interior of the elongated cylinder.

7. Apparatus according to claim 4 wherein the elongated cylinder is about 20 millimeters in length and about 5 millimeters in diameter.

8. Apparatus according to claim 5 wherein said means comprises first and second amplifiers arranged to provide a high impedance circuit and to receive the first and second output signals respectively to produce first and second linearized outputs in accordance therewith and further means to receive the first and second outputs and to produce the resultant output as a function of the difference between the first and second outputs.

9. Apparatus according to claim 5 wherein said means comprises first and second amplifiers connected to provide a low impedance circuit and to receive the first and second signals respectively to produce first and second non-linear outputs in accordance therewith and microprocessor means connected to receive the non-linear outputs, linearize them and produce the resultant output as a function of the difference between the first and second outputs.

10. Radiation sensing apparatus comprising:
   an elongated member consisting of a volume of radiation diffusing material having first and second ends;
   means directing radiation from a remote source to the member at a first position intermediate the first and second ends, the radiation entering into the interior of the diffusing material and therein being diffused by the diffusing material itself so as to travel throughout the volume from the first position towards the first and second ends where it is received in an amount which varies with the distance from the first position to the first and second ends; and
   radiation responsive detector means mounted to receive radiation at the first and second ends to produce first and second output signals in accordance with the amount of radiation received, the first and second output signals varying with the distance from the first position to the first and second ends.

11. Apparatus according to claim 10 wherein the volume is a circular cylinder of diameter equal to approximately 5 millimeters and a length of approximately 20 millimeters and the absorption co-efficient is about 0.15.

12. Apparatus according to claim 10 wherein the diffusing material is an opal material.

13. Apparatus according to claim 10 wherein the diffusing material comprises a plurality of small glass spheres in a clear plastic casting resin.

14. Apparatus according to claim 10 further including means connected to receive and compare the first and second output signals to provide a resultant output signal indicative of the location of the first position between the first and second ends.

15. Apparatus according to claim 13 wherein the plastic spheres are of a diameter between about 10 and 100 microns.

16. Apparatus according to claim 12 where the diffusing material is pot-opal.

17. Apparatus according to claim 14 further including an additional layer of diffusing material on the exterior of the volume proximate the first position and operable to scatter radiation from the remote source into the interior of the diffusing material.

18. Apparatus according to claim 14 further including a reflective coating material surrounding the volume to reflect any escaping radiation back into the interior of the diffusing material and having a window therethrough proximate the first position to admit radiation from the remote source into the interior of the diffusing material.

19. Apparatus according to claim 18 further including an additional layer of diffusing material on the exterior of the volume proximate the first position to scatter radiation from the remote source into the interior of the diffusing material.

* * * * *